May 15, 1928. 1,669,863
S. H. CLARKE
WHEEL FOR AUTOMOBILES
Filed Aug. 22, 1922    2 Sheets-Sheet 1

Inventor
Samuel Herbert Clarke
By Geo. C. Shoemaker
Attorney

May 15, 1928. 1,669,863
S. H. CLARKE
WHEEL FOR AUTOMOBILES
Filed Aug. 22, 1922  2 Sheets-Sheet 2

Inventor
Samuel Herbert Clarke
By Geo. C. Shoemaker
Attorney

Patented May 15, 1928.

1,669,863

UNITED STATES PATENT OFFICE.

SAMUEL HERBERT CLARKE, OF BALTIMORE, MARYLAND.

WHEEL FOR AUTOMOBILES.

Application filed August 22, 1922. Serial No. 583,590.

The invention relates to improvements in wheels for automobiles and various other motor vehicles and the like.

The object of the present invention is to improve the construction of automobile wheels and to provide a simple, practical and efficient automobile wheel of strong, durable and comparatively inexpensive construction equipped with a demountable rim and capable of affording a firmer and surer contact of the rim with the wheel and adapted to afford a free and powerful locking action uniform in its character throughout the rim.

It is also an object of the invention to provide a wheel of this character provided with locking means adapted in the unlocking operation to effect a slight outward movement of the rim with relation to the wheel to brake the contact between the rim and the wheel and effect an easy kick-off or removal of the rim.

It is also an object of the invention to provide a demountable rim construction and locking means adapted to be advantageously employed in various types of pneumatic tires and various kinds of wheels, whether wood spoke, wire spoke or metal disk wheels.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 1:
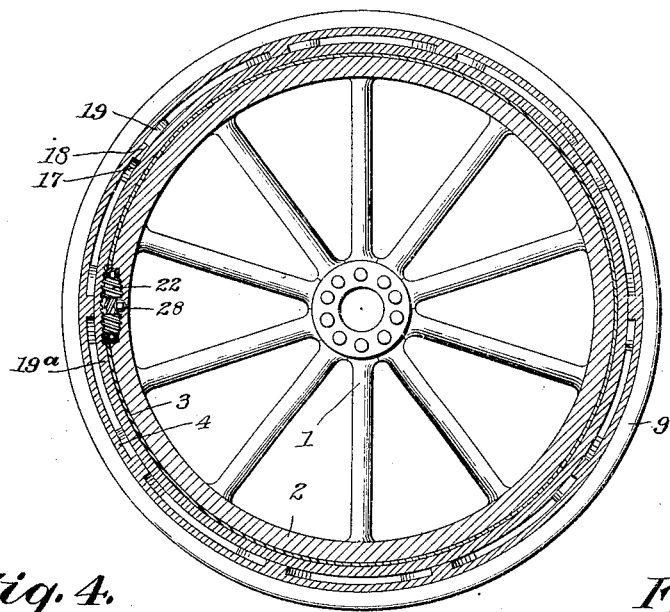
Figure 1 is a vertical sectional view of an automobile wheel constructed in accordance with this invention, the section being taken through the plane of the locking ring.
Figure 4:
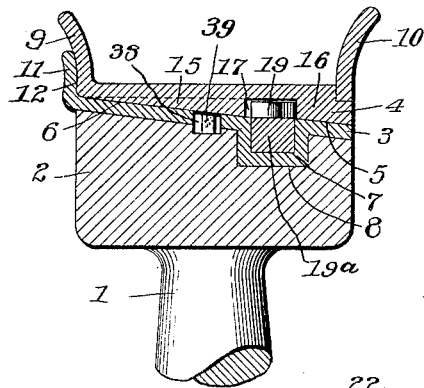
Figure 4 is a transverse sectional view through the rim and the felly of the wheel.
Figure 6:
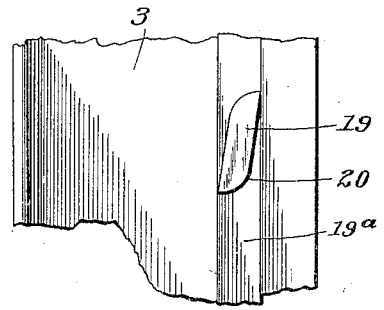
Figure 6 is an enlarged detail view of a portion of the felly band, illustrating the construction of the lugs of the locking ring.
Figure 5:
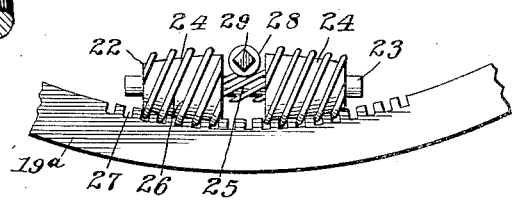
Figure 5 is an enlarged detail view of the double trunco-conical gear element and the meshing portion of the locking ring.
Figures 2, 3:
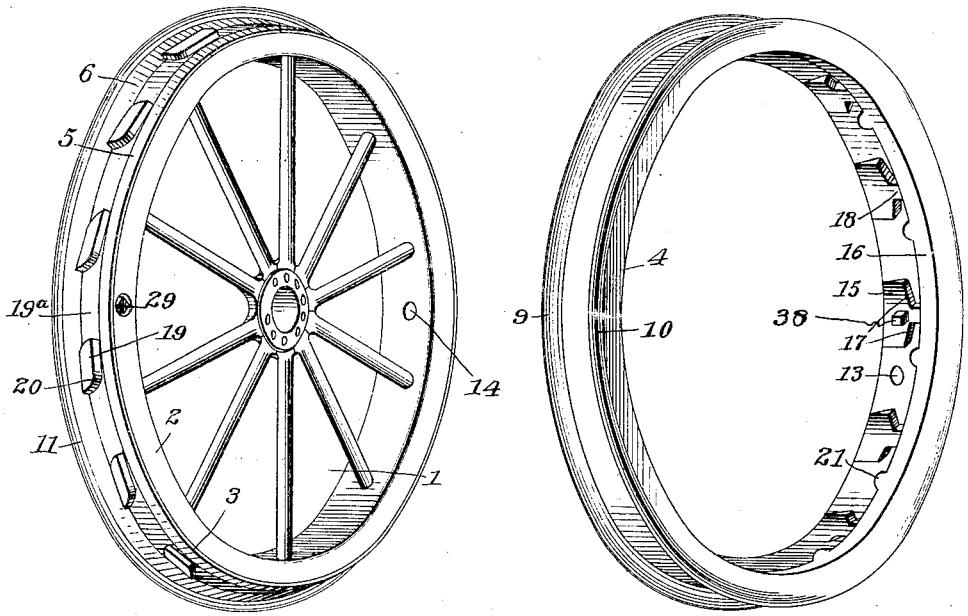
Figure 2 is a perspective view of the wheel, the rim being removed.
Figure 3 is a perspective view of the rim.

In the accompanying drawings, in which is illustrated the preferred embodiment of the invention, 1 designates a wood spoke wheel having a wooden felly 2 and provided with an annular metal felly band 3 adapted to receive a demountable rim 4. The felly band 3 is composed of inner and outer inclined bearing portions 5 and 6 and a depressed or grooved intermediate portion 7 arranged in annular groove 8 in the felly 2 and securely interlocking the felly band with the felly and maintaining the sections of the wheel, when the same is constructed in sections, securely in assembled relation. The felly band 3 forms a band around the wooden felly and will reinforce and strengthen the wheel.

The rim 4 is provided with inner and outer flanges 9 and 10 adapted to receive a pneumatic tire (not shown) between them but the rim may be constructed to receive a clincher tire or any other type of tire, as may be readily understood and one of the flanges may be formed by a removable flange or ring in the ordinary well known manner. The felly band 3 is provided at the inner edge with an inclined or angularly disposed annular flange 11, which is adapted to fit against a beveled or inclined face 12 of the rim to form a stop and also to exclude dust and dirt. The annular groove or depressed portion 7 of the felly band is located at the outer side of the central plane of the wheel in order to arrange it at the outer side of the openings 13 and 14 in the rim and the wheel for the valve stem and the rim is provided at its inner face with spaced bearing lugs 15 which may be of any desired number and which present beveled or inclined inner bearing faces to the inner inclined bearing portion 5 of the felly band 3. The rim is also provided with an outer annular enlargement or flange 16 which fits the outer inclined annular bearing surface or portion 5 of the felly member. The annular enlargement or flange 16 reinforces and stiffens the rim and the bearing lugs 15, which have angularly disposed inner longitudinal edges 17 connected with the annular enlargement or flange 16 by a central web 18 which coacts with the lugs and the annular enlargement or flange 16 to reinforce and prevent distortion of the rim and locking ring. The rim, when placed on the felly band of the wheel, has a wedging action or tight fit and it is forced into firm contact with the felly member by lugs 19 formed integral with a locking ring 19ª and adapted, by a partial rotary movement of the locking ring, to be carried into and out of engagement with the outer circumferential edges of the bearing lugs, whereby the rim will be forced into a tight wedging fit with the felly member and securely and tightly locked on the same. The lugs 19 are arranged at an angle or diagonally with relation to the annular locking ring and they have rounded corners 20 to facilitate their engagement with the lugs and also with rounded projections or protuberances 21 formed integral with the annular flange or enlargement of the rim and arranged at the inner edge thereof. These projections or protuberances 21 are engaged by the lugs of the locking ring in the unlocking action or movement of the ring and they operate to break the contact of the rim with the wheel and kick off the rim and thereby enable an easy removal or demouting of the rim to be effected.

In practice the wheels will be made right and left hand, that is the locking rings in their locking movement will move rearwardly in opposite direction to the forward rotation of the wheels so that the tendency of the wheels in rotating will be to maintain the locking rings in their engaging position rather than to rotate the locking rings in a direction to unlock the rims.

The partial rotary movement of the locking ring to lock and unlock the rim is effected by actuating mechanism located diametrically opposite the valve stem openings and comprising a substantially double truncoconical gear element 22 constructed of a single piece of metal and provided with terminal journals 23 which are mounted in suitable bearings in the felly of the wheel. The gear element 22 is composed of oppositely tapered portions 24 and an intermediate reduced connecting portion 25. The tapered portions are arcuate in longitudinal contour to conform to the curvature of the locking ring and they are provided with spiral threads 26 which interlock with teeth 27 of the locking ring substantially throughout the entire length of the said tapered portions. The teeth 27 are cut in the locking ring and the central or intermediate portion 25 forms a worm wheel which meshes with a transversely disposed worm 28, having a polygonal end 29 adapted to receive a key or other suitable device for rotating the worm for actuating the gear element 22.

The worm wheel is mounted in suitable bearings and when rotated imparts a rotary movement to the gear element 22, which will both push and pull the locking ring in rotating the same as the tapered thread bearing portions are located in advance and in rear of the centrally arranged worm 28. This will produce a uniform locking action and pull on the locking lugs so that the rim of the wheel will be quickly forced inwardly at spaced points throughout its entire inner periphery. The rearward rotation of the locking rings will carry the lugs 19 across the outer side edges of the bearing lugs 15 and the wedging action of the contacting parts will limit the rotary movement of the locking ring. Also the worms formed by the tapered portions of the gear element coact with the worm 28 to provide a lock for preventing rotary movement of the locking ring and this cooperates with the rearward movement of the locking ring in its locking action and the tendency of the forward rotation of the wheels of the vehicle to maintain the locking ring in its locking position.

Figure 7:
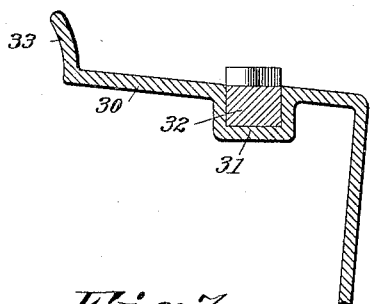
Figure 7 is a detail view of a portion of a metal disk wheel.
Figure 8:
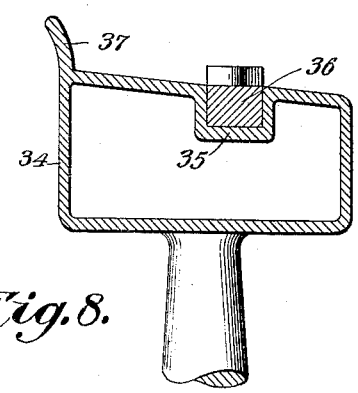
Figure 8 is a similar view of a portion of a wheel having a hollow metal felly.

The improvements are applicable not only to wooden wheels but to various other types of wheels and in Figure 7 of the drawings is illustrated a portion of a disk wheel having an integral felly 30 provided with a grooved or depressed portion 31 to receive a locking ring 32 and having an annular stop flange 33. In Figure 8 is illustrated a hollow metallic felly 34 having a depressed circumferentially grooved or depressed portion 35 to receive a locking ring 36 and provided with a stop flange 37. The demountable rim and the locking means may be applied to any form of wheel of the character designed for automobiles and other motor vehicles and the like.

It will be seen that there is a single point of application of force to rotate the locking ring and that a uniform movement of the rim is effected in wedging the same on the wheel and that the rim and tire will be perfectly positioned and the wear on the tire will be uniform.

One of the bearing lugs, preferably adjacent the holes for the valve stem, is provided with a transverse rib or flange 38 to engage a corresponding groove or slot 39 formed in the felly band. The groove or slot is preferably slightly longer than the rib or flange in a direction parallel to the axis of the wheel and upon the interlocking of the rim with the felly band by the rib or flange and groove or slot the rotation of the rim with the wheel and proper alignment of the rim on the wheel are assured. One or more of the interlocking ribs and slots may, of course, be employed.

The bearing surface of the rim and the felly band insure proper alignment of the rim and the tire, causing even wear and longer life of the tire. Also the forward rotation of the wheels tends to hold the locking ring in engagement with the lugs of the rim. The flange of the felly and the annular flange or enlargement of the rim provide a tight joint or connection at each side of the wheel, adapted to exclude dust, dirt, water, etc., and at the same time the annular flange or enlargement of the rim stiffens and prevents buckling of the same. The actuating gearing affords greater power with only a slight application of force on the part of the operator and the worms also result in a double locking action of the parts while the double trunco-conical element provides a stop for limiting the movement of the locking ring in unlocking the rim.

What is claimed is:

1. A wheel of the class described, including a felly, a locking ring mounted on the felly for rotary movement and provided with teeth, a rim arranged on the felly, said rim and locking ring having co-acting means for retaining the rim on the felly, and an oppositely tapered gear element presenting an arcuate longitudinal contour to conform to the curvature of the locking ring and provided with spiral threads engaging the teeth of the locking ring throughout substantially the entire length of the tapered portions, and means for rotating the gear element to lock and release the rim.

2. A wheel of the class described, including a felly, a locking ring mounted on the felly for rotary movement and provided with teeth, a rim arranged on the felly, said rim and locking ring having co-acting means for retaining the rim on the felly, an oppositely tapered gear element presenting an arcuate longitudinal contour to conform to the curvature of the locking ring and provided with spiral threads engaging the teeth of the locking ring throughout substantially the entire length of the tapered portions, said gear element being provided between the tapered portions with an integral worm wheel, and a worm meshing with the worm wheel for rotating the gear element to lock and release the rim.

3. A wheel of the class described, including a felly, a locking ring mounted on the felly for rotary movement and provided with teeth, a rim arranged on the felly, said rim and locking ring having co-acting means for retaining the rim on the felly, an oppositely tapered gear element presenting an arcuate longitudinal contour to conform to the curvature of the locking ring and provided with spiral threads engaging the teeth of the locking ring throughout substantially the entire length of the tapered portions, said gear element having terminal bearing portions and provided with a central integral worm wheel, and a transverse worm operating between the tapered portions of the gear element and meshing with the worm wheel for rotating the gear element to lock and unlock the rim.

4. A wheel of the class described including a felly band having an annular groove and provided at the inner side thereof with an inclined bearing portion, a locking ring operating in the groove and provided with lugs, a rim having spaced tapering bearing lugs seated upon the said inclined bearing portion of the felly band beyond the groove and arranged to be engaged by the lugs of the locking ring and means for imparting a rotary movement to the locking ring to engage and disengage the said lugs.

5. A wheel of the class described including a felly band having an annular groove and provided at the inner side thereof with an inclined bearing portion, a locking ring operating in the groove and provided with lugs, a rim having spaced tapering bearing lugs seated upon the bearing portion of the felly band beyond the said groove and arranged to be engaged by the lugs of the locking ring, means for imparting a rotary movement to the locking ring to engage and disengage the said lugs and means carried by the rim and arranged to be engaged by the lugs of the locking ring to force the rim outwardly in the unlocking movement of the said ring.

6. A wheel of the class described including a felly band provided with inner and outer inclined bearing surfaces and having an annular groove located between the said bearing surfaces, a rim provided at intervals with spaced tapering bearing lugs seated upon one of the said bearing surfaces of the felly band beyond the groove thereof and having an inclined bearing portion seated upon the other bearing surface of the felly band beyond the opposite side of the groove and a locking ring operating in the said groove and provided with means for engaging the lugs of the rim.

7. A wheel of the class described including a felly band provided with inner and outer inclined bearing portions and having an intermediate annular groove, a rim provided with inner spaced tapering lugs seated upon the inner bearing portion of the felly band beyond the said groove and having at the outer portion an annular flange presenting an inclined bearing surface to the outer inclined bearing surface of the felly band and located beyond the opposite side of the groove said flange being provided at the inner edge with protuberances located at the spaces between the bearing lugs, and a locking ring operating in the groove of the felly band and provided with lugs having angularly disposed longitudinal edges arranged to engage the lugs of the rim to wedge the latter on the felly band and also to engage the projections or protuberances of the rim to force the same outwardly in the unlocking movement of the locking ring.

8. A wheel of the class described including a felly band provided at the inner side with an annular stop flange and having inner and outer inclined bearing portions and an intermediate groove, a rim provided with inner spaced tapering bearing lugs seated upon the inner bearing portion of the felly band and having angularly disposed circumferential edges said rim being also provided with an outer annular flange presenting an inclined bearing surface to the outer bearing portion of the felly band and having protuberances at its inner edge, the lugs and annular flange of the rim being located at the opposite walls of the groove, and a locking ring operating in the groove and provided with diagonally disposed lugs engaging the lugs of the rim to lock and release the same.

9. A wheel of the class described including a felly band presenting inclined inner and outer bearing surfaces and having an annular groove between the same, a rim arranged on the felly band and provided with inner tapered bearing lugs seated upon the inner bearing surface of the felly band and provided with an outer annular flange presenting an inclined bearing surface to the outer bearing surface of the felly band, said rim being also provided with webs arranged centrally of the lugs and connecting the same with the flange, the lugs and the flange being located at opposite sides of the groove in the felly band and a locking ring operating in the groove and having lugs provided with angularly disposed edges and rounded corners and adapted to engage the lugs of the rim.

10. A wheel of the class described, including a felly presenting inclined inner and outer bearing surfaces and having a groove or depression between the same, a rim arranged on the felly and provided with inner tapered bearing lugs to fit the inner bearing surface of the felly and provided with an outer annular enlargement or flange presenting an inclined bearing surface to the outer bearing surface of the felly, said rim being also provided with webs arranged centrally of the lugs and connecting the same with the flange or enlargement, said rim being provided at the inner edge of the annular flange or enlargement with protuberances, and a locking ring operating in the groove or depression of the felly and provided with diagonally disposed lugs having rounded corners and adapted to engage the lugs or protuberance of the rim to lock and release the latter.

11. A wheel of the class described, including a felly having an inclined bearing portion, a locking ring mounted in the felly and provided with lugs, a rim having spaced tapered bearing lugs fitting the bearing portion of the felly and arranged to be engaged by the lugs of the locking ring, one of the lugs and the bearing surface having a transversely disposed interlocking rib and slot, and means for imparting a rotary movement to the locking ring to engage and disengage the lugs thereof with the lugs of the rim.

12. A wheel of the class described including a body portion equipped at its periphery with inclined inner and outer bearing surfaces and having an annular groove between the same, a removable rim provided with inner tapered bearing lugs seated upon the said inner bearing surface and provided with an outer annular flange presenting an inclined bearing surface to the said outer bearing surface, said rim being also provided with webs arranged centrally of the lugs and connecting the same with the said flange, the lugs and the flange of the rim being located at opposite sides of the said annular groove and a locking ring operating in the groove and having lugs provided with angularly disposed edges and arranged to engage the lugs of the rim.

In testimony whereof I have hereunto set my hand.

SAMUEL HERBERT CLARKE.